US010019796B2

(12) United States Patent
Al-Kofahi et al.

(10) Patent No.: US 10,019,796 B2
(45) Date of Patent: Jul. 10, 2018

(54) SYSTEM AND METHOD FOR BLOOD VESSEL ANALYSIS AND QUANTIFICATION IN HIGHLY MULTIPLEXED FLUORESCENCE IMAGING

(71) Applicant: GENERAL ELECTRIC COMPANY, Schenectady, NY (US)

(72) Inventors: Yousef Al-Kofahi, Niskayuna, NY (US); Anup Sood, Clifton Park, NY (US); Fiona Ginty, Niskayuna, NY (US); Qing Li, Niskayuna, NY (US); Christopher James Sevinsky, Watervliet, NY (US); Alberto Santamaria-Pang, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/270,061

(22) Filed: Sep. 20, 2016

(65) Prior Publication Data
US 2017/0109880 A1 Apr. 20, 2017

Related U.S. Application Data

(60) Provisional application No. 62/242,363, filed on Oct. 16, 2015.

(51) Int. Cl.
 *G06T 7/00* (2017.01)
 *G06T 11/60* (2006.01)

(52) U.S. Cl.
 CPC .......... *G06T 7/0012* (2013.01); *G06T 7/0042* (2013.01); *G06T 7/0087* (2013.01);
(Continued)

(58) Field of Classification Search
 CPC . G06T 2207/30024; G06T 2207/10056; G06T 2207/10064; G06T 2207/30101;
(Continued)

(56) References Cited

U.S. PATENT DOCUMENTS

| 7,043,064 | B2 * | 5/2006 | Paik ........................ G06K 9/48 128/922 |
| 7,899,624 | B2 * | 3/2011 | Cualing ........... G01N 33/57492 382/133 |

(Continued)

OTHER PUBLICATIONS

Folkman, "Tumor Angiogenesis: Therapeutic Implications", The New England Journal of Medicine, vol. No. 285, Issue No. 21, pp. 1182-1186, Nov. 18, 1971.

(Continued)

*Primary Examiner* — Michael Osinski
(74) *Attorney, Agent, or Firm* — GE Global Patent Operation; Nitin Joshi

(57) ABSTRACT

Disclosed are novel computer-implemented methods for creating a blood vessel map of a biological tissue. The methods comprise the steps of, accessing image data corresponding to multi-channel multiplexed image of a fluorescently stained biological tissue manifesting expression levels of a primary marker and at least one auxiliary marker of blood vasculature, and extracting features of blood vessels using the primary marker as an input to create a single channel segmentation of the blood vessels. The method further comprises the steps of extracting features of blood vessels using the auxiliary marker to create auxiliary channels as a second input and apply multi-channel blood vessel enhancement. Blood vessel maps are created using the features and tracing the blood vasculature by iteratively extending the centerlines of the initial segmentation using statistical models and geometric rules.

17 Claims, 13 Drawing Sheets

(52) U.S. Cl.
CPC ..... *G06T 11/60* (2013.01); *G06T 2207/10004* (2013.01); *G06T 2207/10056* (2013.01); *G06T 2207/10064* (2013.01); *G06T 2207/20076* (2013.01); *G06T 2207/20144* (2013.01); *G06T 2207/30101* (2013.01); *G06T 2207/30172* (2013.01); *G06T 2207/30204* (2013.01)

(58) Field of Classification Search
CPC . G06T 2207/20041; G06T 2207/20212; G06T 2207/20044; G06T 7/0012; G06T 7/11; G06T 7/155; G06T 7/187; G06T 7/12; G06T 7/194; G06K 9/0014; G06K 9/00127; G06K 9/00147; G06K 2209/05; G01N 1/30
See application file for complete search history.

(56) References Cited

U.S. PATENT DOCUMENTS

| | | | | |
|---|---|---|---|---|
| 8,023,703 | B2* | 9/2011 | Franaszek | G06K 9/34 382/128 |
| 8,073,226 | B2* | 12/2011 | Farag | G06K 9/0014 378/21 |
| 8,300,938 | B2 | 10/2012 | Can et al. | |
| 8,385,688 | B2* | 2/2013 | Gong | G06K 9/6206 382/128 |
| 8,582,861 | B2* | 11/2013 | Hasslmeyer | G06T 7/194 382/133 |
| 8,724,866 | B2* | 5/2014 | Wu | G06K 9/4638 382/128 |
| 8,737,709 | B2 | 5/2014 | Kamath et al. | |
| 8,995,740 | B2* | 3/2015 | Santamaria-Pang | G06K 9/0014 382/133 |
| 9,286,505 | B2* | 3/2016 | Ajemba | G06T 7/0012 |
| 9,725,766 | B1* | 8/2017 | Potts | C12Q 1/6876 |
| 2002/0154798 | A1* | 10/2002 | Cong | G01N 15/14 382/128 |
| 2007/0026525 | A1* | 2/2007 | Marcelpoil | G01N 1/30 436/63 |
| 2008/0002870 | A1* | 1/2008 | Farag | G06K 9/0014 382/128 |
| 2008/0008367 | A1* | 1/2008 | Franaszek | G06K 9/34 382/128 |
| 2008/0032328 | A1* | 2/2008 | Cline | G01N 1/30 435/40.5 |
| 2008/0033657 | A1* | 2/2008 | Cline | G06K 9/0061 702/19 |
| 2010/0054525 | A1* | 3/2010 | Gong | G06K 9/6206 382/100 |
| 2011/0075920 | A1* | 3/2011 | Wu | G06K 9/4638 382/160 |
| 2013/0216110 | A1* | 8/2013 | Zheng | G06K 9/34 382/128 |
| 2013/0230230 | A1* | 9/2013 | Ajemba | G06T 7/0012 382/133 |
| 2014/0056505 | A1* | 2/2014 | Hoyt | G06K 9/00127 382/133 |
| 2014/0078152 | A1* | 3/2014 | Chang | G06T 7/12 345/441 |
| 2014/0314299 | A1* | 10/2014 | Santamaria-Pang | G06K 9/0014 382/133 |
| 2016/0321809 | A1* | 11/2016 | Chukka | G06K 9/0014 |
| 2016/0335478 | A1* | 11/2016 | Bredno | G06K 9/00147 |
| 2017/0154420 | A1* | 6/2017 | Barnes | G06T 7/0012 |
| 2017/0169567 | A1* | 6/2017 | Chefd'hotel | G06K 9/00127 |
| 2017/0294017 | A1* | 10/2017 | Yuan | G06T 7/0012 |
| 2017/0298434 | A1* | 10/2017 | Potts | C12Q 1/6876 |
| 2018/0012365 | A1* | 1/2018 | Chefd'hotel | G06T 7/187 |
| 2018/0053299 | A1* | 2/2018 | Gholap | G06T 7/0014 |

OTHER PUBLICATIONS

Baum et al., "Isolation of a Candidate Human Hematopoietic Stem-Cell Population", Proceedings of the National Academy of Sciences of the United States of America, vol. No. 89, pp. 2804-2808, Apr. 1992.

Weidner et al., "Tumor Angiogenesis Correlates with Metastasis in Invasive Prostate Carcinoma", American Journal of Pathology, vol. No. 143, Issue No. 02, pp. 401-409, Aug. 1993.

Sato et al., "3D Multi-scale Line Filter for Segmentation and Visualization of Curvilinear Structures in Medical Images", Springer Berlin Heidelberg, vol. No. 1205, pp. 213-222, 1997.

Wood et al., "CD34 Expression Patterns During Early Mouse Development Are Related to Modes of Blood Vessel Formation and Reveal Additional Sites of Hematopoiesis", Blood, vol. No. 90, Issue No. 06, pp. 2300-2311, 1997.

Frangi et al., "Multiscale Vessel Enhancement Filtering", Springer Berlin Heidelberg, vol. No. 1496, pp. 130-137, 1998.

Chan "Active Contours Without Edges", IEEE Transactions on Image Processing, vol. No. 10, Issue No. 02, pp. 266-277, Feb. 2001.

McGinley et al., "Semi-automated Method of Quantifying Vasculature of 1-Methyl-1-Nitrosourea-Induced Rat Mammary Carcinomas Using Immunohistochemical Detection", The Journal of Histochemistry & Cytochemistry, vol. No. 50, Issue No. 02, pp. 213-222, 2002.

Suri et al., "Shape Recovery Algorithms Using Level Sets in 2-D/3-D Medical Imagery: A State-of-the-Art Review", IEEE Transactions on Information Technology in Biomedicine, vol. No. 6, Issue No. 01, pp. 8-28, Mar. 2002.

Yu et al., "A Segmentation-Free Approach for Skeletonization of Gray-Scale Images via Anisotropic Vector Diffusion", Proceedings of the 2004 IEEE Computer Society Conference on Computer Vision and Pattern Recognition, vol. No. 01, pp. 415-420, 2004.

Trojan et al., "Expression of Different Vascular Endothelial Markers in Prostate Cancer and BPH Tissue:An Immunohistochemical and Clinical Evaluation", Anticancer Research, vol. No. 24, pp. 1651-1656, 2004.

Uzzan et al., "Microvessel Density as a Prognostic Factor in Women with Breast Cancer: A Systematic Review of the Literature and Meta-Analysis", Cancer Research, vol. No. 64, Issue No. 09, pp. 2941-2955, May 2004.

Moll et al., "Path Planning for Variable Resolution Minimal-Energy Curves of Constant Length", International Conference on Robotics and Automation, pp. 2130-2135, 2005.

Niishida et al., "Angiogenesis in Cancer", Vascular Health and Risk Management, vol. No. 02, Issue No. 03 pp. 213-219, 2006.

Fleuret et al., "Dendrite Tracking in Microscopic Images using Minimum Spanning Trees and Localized E-M", Dendritic Tree Tracking, pp. 1-12, 2006.

Wong et al., "Augmented Vessels for Quantitative Analysis of Vascular Abnormalities and Endovascular Treatment Planning", IEEE Transactions on Medical Imaging, vol. No. 25, Issue No. 06, pp. 665-684, Jun. 2006.

Wesarg et al., "Localizing Calcifications in Cardiac CT Data Sets Using a New Vessel Segmentation Approach", Journal of Digital Imaging, vol. No. 19, Issue No. 03, pp. 249-257, Sep. 2006.

Worz et al., "Segmentation and Quantification of Human Vessels Using a 3-D Cylindrical Intensity Model", IEEE Transactions on Medical Imaging, vol. No. 16, Issue No. 08, pp. 1994-2004, 2007.

Sullivan et al., "Microvessel Area Using Automated Image Analysis is Reproducible and is Associated with Prognosis in Breast Cancer", Human Pathology, vol. No. 40, Issue No. 02, pp. 156-165, Feb. 2009.

Deschamps et al., "Fast Extraction of Minimal Paths in 3D Images and Applications to Virtual Endoscopy", Medical Image Analysis, vol. No. 05, pp. 281-299, 2011.

Carmeliet et al., "Molecular Mechanisms and Clinical Applications of Angiogenesis", Nature, vol. No. 473, Issue No. 7347, pp. 298-307, May 19, 2011.

Liu et al., "CD31: Beyond a Marker for Endothelial Cells", Cardiovascular Research, vol. No. 94, pp. 3-5, 2012.

(56) References Cited

OTHER PUBLICATIONS

Yadav et al., "Tumour Angiogenesis and Angiogenic Inhibitors: A Review", Journal of Clinical and Diagnostic Research, vol. No. 09, Issue No. 06, pp. 1-5, Jun. 2015.

* cited by examiner

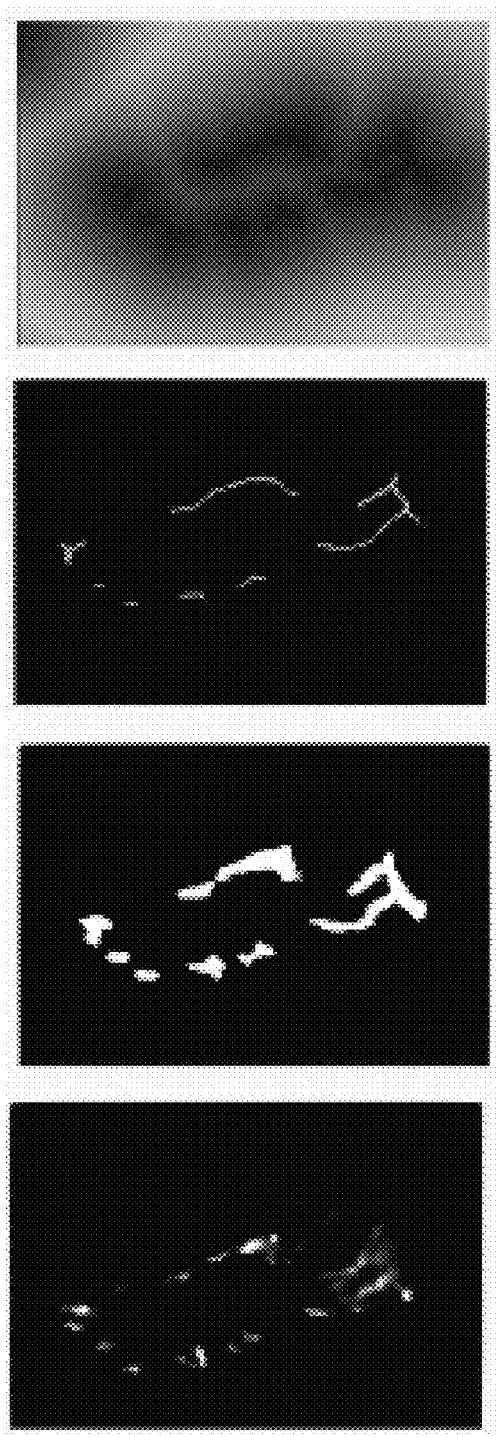

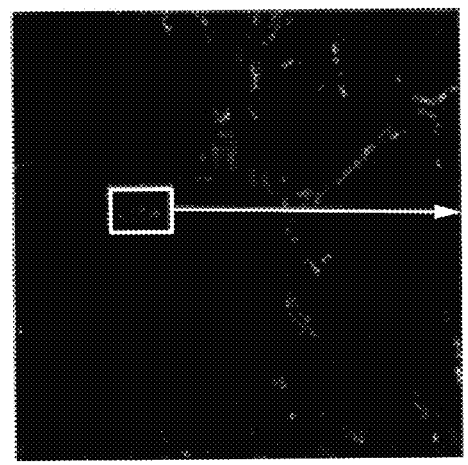
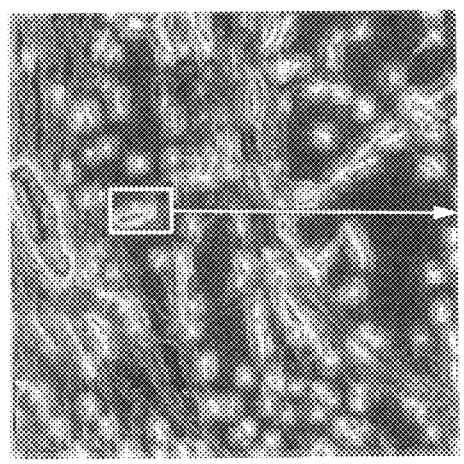
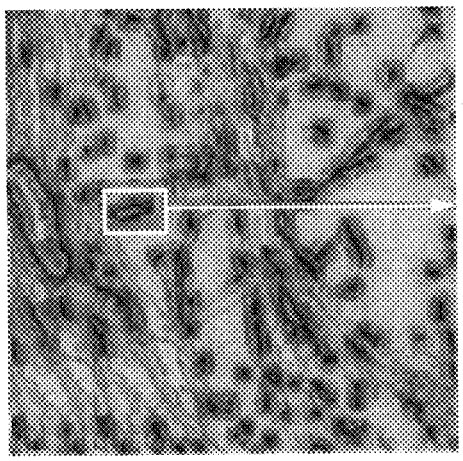
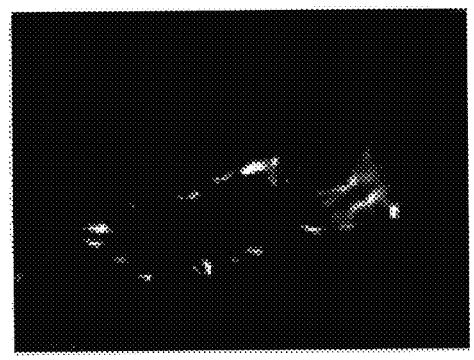
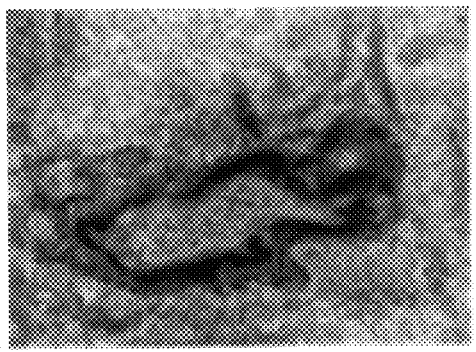
*Fig. 5A*
*Fig. 5B*
*Fig. 5C*

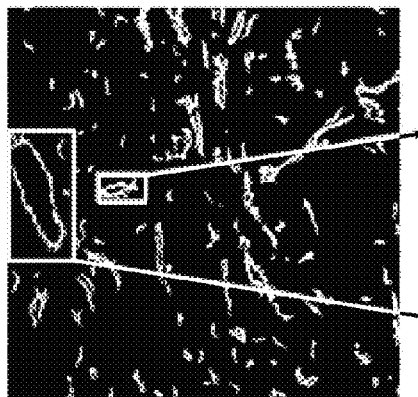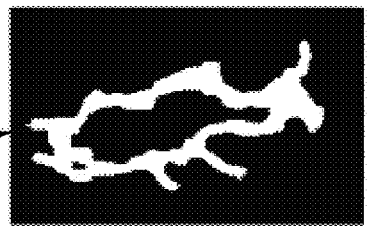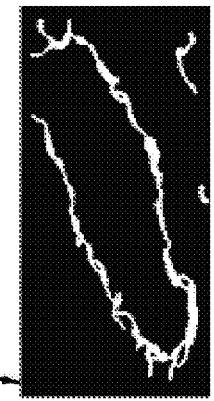
*Fig. 11C*
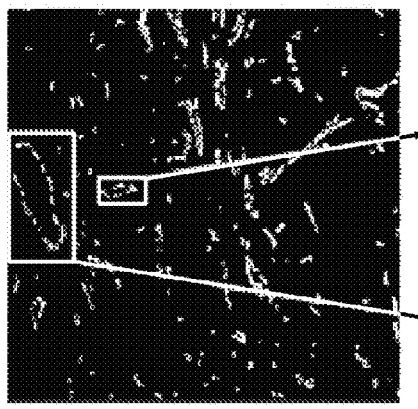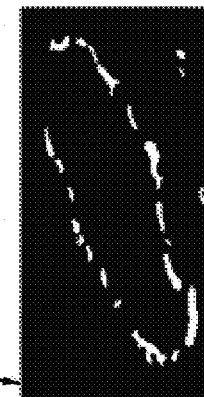
*Fig. 11B*
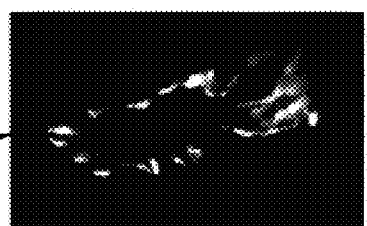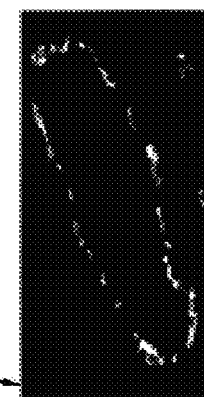
*Fig. 11A*

SYSTEM AND METHOD FOR BLOOD VESSEL ANALYSIS AND QUANTIFICATION IN HIGHLY MULTIPLEXED FLUORESCENCE IMAGING

CROSS-REFERENCE TO RELATED APPLICATIONS

This application is related to U.S. provisional patent application 62/242,363 filed Oct. 16, 2015 and entitled "Systems and Method for Blood Vessels Analysis in Highly Multiplexed Fluorescence Imaging", the entire disclosure is incorporated herein by reference.

BACKGROUND

Understanding the pathophysiology and developmental biology of the vascular system is a major focus of biomedical research. In addition to cardiovascular disease, vascular pathology is a hallmark characteristic of cancer development, progression and metastasis. Tumors must develop and maintain new blood vasculature in order to meet basic nutrient and oxygen demands and to eliminate toxic byproducts of rapid metabolism. Blood vessel growth is influenced by factors secreted in the tumor, stroma and endothelial cells. Tumors also metastasize to other regions of the body through the blood vasculature, and disseminated disease is the most common cause of death due to cancer. Studies have shown correlations between vessel density and poor prognosis in some, but not all cancers. There is significant focus on different methods for characterization of blood vessels by in vitro methods (discussed further below) and blood flow by in vivo imaging methods such as contrast-enhanced ultrasound imaging or dynamic contrast enhanced (DCE)-MRI as it is essential for understanding of tumor progression and developing new diagnostic and therapeutic approaches.

Angiogenesis is the development of new vasculature from existing vasculature. In this process, endothelial cells sprout from preexisting vessels, proliferate and form new vessels. In addition to being an essential function of normal developmental physiology, angiogenesis is of central importance to the growth of tumors, as failure to develop new vasculature limits growth of solid tumors to less than 2-3 mm. Angiogenic vessels have irregular structures with abnormal blood flow and heterogeneous distribution. They tend to be easily compressed, resulting in hypoxia and heterogeneity in blood flow. In recognition of this, drugs intended to inhibit angiogenesis have been developed and are used to treat various human cancers. This therapeutic avenue remains an important component of drug discovery and development and several anti-angiogenesis drugs are now FDA approved for certain cancers (e.g. Bevacizumab (Avastin or Ramucirumab (Cyramza). While much progress in the translation of angiogenesis research to clinical applications has been made, available treatments targeting angiogenesis in cancer achieve relatively modest efficacy in the clinic.

Typical vasculature characterization methods involve immunohistochemical staining of protein antigens normally expressed by the endothelial cells of the blood vessel wall. Common antigens used to characterize vessels include CD31 (PECAM1), CD34 (Hematopoietic progenitor cell antigen CD34), and von Willebrand Factor (vWF—Factor VIII Related Antigen). The characterization and quantification of vascular features using this protein expression information includes micro vessel counts, microvessel density (MVD) and morphology metrics (size, dimension etc). Correlated protein expression (e.g. VEGF) patterns is also an important aspect of understanding effects of angiogenesis on local biology. Quantitation methods including direct immunohistochemistry-based microvessel density, have been used, whereby microvessels/endothelial cells are counted in a standardized grid using light microscopy and expressed as microvessel density (MVD). Microvessel density (MVD) has been found to be associated with poorer prognosis in some but not all cancers. To date, MVD has not been shown to be a valid measure to guide or evaluate anti-angiogenic treatment; the complex geometry and heterogeneity of tumor vasculature mean that vascular network cannot be measured by MVD counts alone.

Further, while the previously described proteins are expressed by endothelial cells, each is limited by certain shortcomings. For example, CD31 is considered to be universally expressed by all endothelial cells of the blood vasculature. However, it is also expressed by several cells of the immune system (e.g., monocytes, granulocytes, lymphocytes). This limits its utility in automated image analysis algorithms, as cells other than those comprising vessels can be erroneously classified as endothelial cells. In addition, in fluorescence microscopy, anti CD31 antibodies often stains discontinuous segments of cells, including incomplete lining of the vessel lumen and endothelial cell junctions. It is therefore challenging to segment individual vessels stained by anti-CD31 immunofluorescence; segmentation results in fragments of vessels, resulting in overestimation of vessel number and underestimation of vessel size. Similar problems are found in immunofluorescence targeting CD34, a marker of blood vessel progenitor cells, hematopoietic stem cells, white blood cells and certain fibroblasts. von Willebrand Factor staining characteristics pose an additional challenge: endothelial cells of immature neoangiogeneic vasculature do not express vWF, resulting in underestimates of vessel counts if used for image segmentation and vessel quantification. Stains of the additional proteins listed above are all limited by similar problems, and other than staining CD31, CD34, and vwF on separate tissue sections and correlating MVD results, no universal marker has been advanced to solve the issues described. These problems are universally encountered by scientists and clinicians seeking automated approaches to sole vessel analysis problems, limiting progress in vessel biology research.

Therefore, cancer biologists still seek to better understand the cancer angiogenesis, inhibition and resistance process, and new analytical methods are an important means to improve resolution of this problem.

BRIEF DESCRIPTION

Disclosed herein are novel computer-implemented methods for creating a blood vessel map of a biological tissue.

In one embodiment, the method comprising the steps of, accessing image data corresponding to multi-channel multiplexed image of a biological tissue fluorescent stained to manifest expression levels of a primary marker and at least one auxiliary marker each marker capable of marking blood vasculature, and extracting features of blood vessels using the primary marker as an input to create a single channel segmentation of the blood vessels. The method further comprises the steps of extracting features of blood vessels using the at least one auxiliary marker to create auxiliary channels as a second input and apply multi-channel blood vessel enhancement, computing a probability map using the features, tracing the blood vasculature by iteratively extending the centerlines of the initial segmentation using statistical models and geometric rules; and generating a blood vessel map.

In some embodiments, the computer-implemented method is used for identifying and quantifying blood vessels in a digital image of a tissue. The method comprises, accessing image data corresponding to multi-channel multiplexed image of a biological tissue fluorescent stained to manifest expression levels of a primary marker and at least one auxiliary marker each marker capable of marking blood vasculature, and extracting features of blood vessels using the primary marker as an input to create a single channel segmentation of the blood vessels. The method further comprises extracting features of blood vessels using the at least one auxiliary marker to create auxiliary channels as a second input and apply multi-channel blood vessel enhancement, and tracing and segmenting the image to identify blood vessels by applying the single channel segmentation and the multi-channel vessel enhancement.

DESCRIPTION OF THE FIGURES

FIG. 1A is raw date using CD31 marker, FIG. 1B is an expanded region of FIG. 1A, FIG. 1C is the same image as FIG. 1A using a segmentation approach, FIG. 1D is the same expanded region as FIG. 1B from FIG. 1D.

FIG. 3A shows raw/input images while FIGS. 3B-3D show close-ups of the computed features for the region in the outlined box; normalized intensity (FIG. 3B), vesselness (FIG. 3C), and cross-correlation with CD31 (FIG. 3D).

FIGS. 4A-D shows a sample distance map; computing distance from initial CD31 segmentation centerline; input image (FIG. 4A), initial segmentation (FIG. 4B), segmentation centerline (FIG. 4C), and distance map (FIG. 4D).

FIGS. 5A-5C are images of sample vessel/foreground and non-vessel/background probability maps. FIG. 5A is the raw image of CD 31 marker, FIG. 5B is the foreground probability map, and FIG. 5C is the background probability map. Each image shows the same expanded region.

FIG. 9A is iteration 1, FIG. 9B is iteration 2, FIG. 9C is iteration 3, and FIG. 9D is iteration 4.

FIGS. 11A-C illustrate sample blood vessel segmentation results using a single marker (CD31) approach and the new multi-marker approach; FIG. 11A is the raw data image using CD31 marker, FIG. 11B is the single-marker segmentation of the raw image, and FIG. 11C is the multi-marker segmentation.

FIG. 12A is the raw data image using CD31 marker, FIG. 12B is the single-marker segmentation of the raw image, and FIG. 12C is the multi-marker segmentation.

DETAILED DESCRIPTION

Methods of segmenting and analyzing blood vessels in microscopic images have been used in medical imaging. In general, the methods have involved; Level-set models, based on geometric properties of structures which are dynamically deformed under the influence of external (image) and internal (shape) forces, Tubular-enhancing filtering methods designed to capture tubular morphology of 2D or 3D volumetric tubular structures by enhancing the tubular topology and, Medial axis extraction methods aim to extract the centerline or skeleton of the tubular object of interest. While these approaches may address the segmentation of blood vessels, they are not suitable for integrating information from multiple markers in two dimensional sections and therefore they are limited in the segmentation and detection capabilities for blood vessels.

As such, in certain embodiments, a multi-channel algorithm for segmenting two-dimensional blood vessels have been developed. The method includes integrating how the blood vessel marker is co-expressed with a dynamically estimate optimal correlation metrics to drive the segmentation. As used herein blood vessels may also be referred to as vasculature.

In certain embodiments, the method involves use of digital images obtained from multi-channel segmentation processes using multiplexed images of tissue samples, such as biopsy or surgical tissue samples. In general, a multiplexed image typically consists of "N" number of channels of the same tissue section, where each channel provides a detailed and unique protein expression profile of the tissue of interest, thereby describing, for example, both the morphology and molecular composition of cancer tumors. Thus, local tissue quantification at both the molecular and morphological level is possible by applying image analysis methods to multiplexed imaging in tissue micro-arrays and whole tissue sections. This type of segmentation of registered multiplexed images, has been described for example in U.S. Pat. No. 8,995,740 issued Mar. 31, 2015, U.S. Pat. No. 8,737,709 issued May 27, 2014, and U.S. Pat. No. 8,300,938 issued Sep. 4, 2010. The method generally includes sequential steps of staining a tissue sample with at least one fluorescently-labelled marker, detecting signal from the markers, actively removing the signals from the tissue, and re-staining the same tissue with at least one additional fluorescently-labelled marker. The images obtained are registered and transformed to create a composite image which may be qualitatively or quantitatively analyzed.

Figure 1:
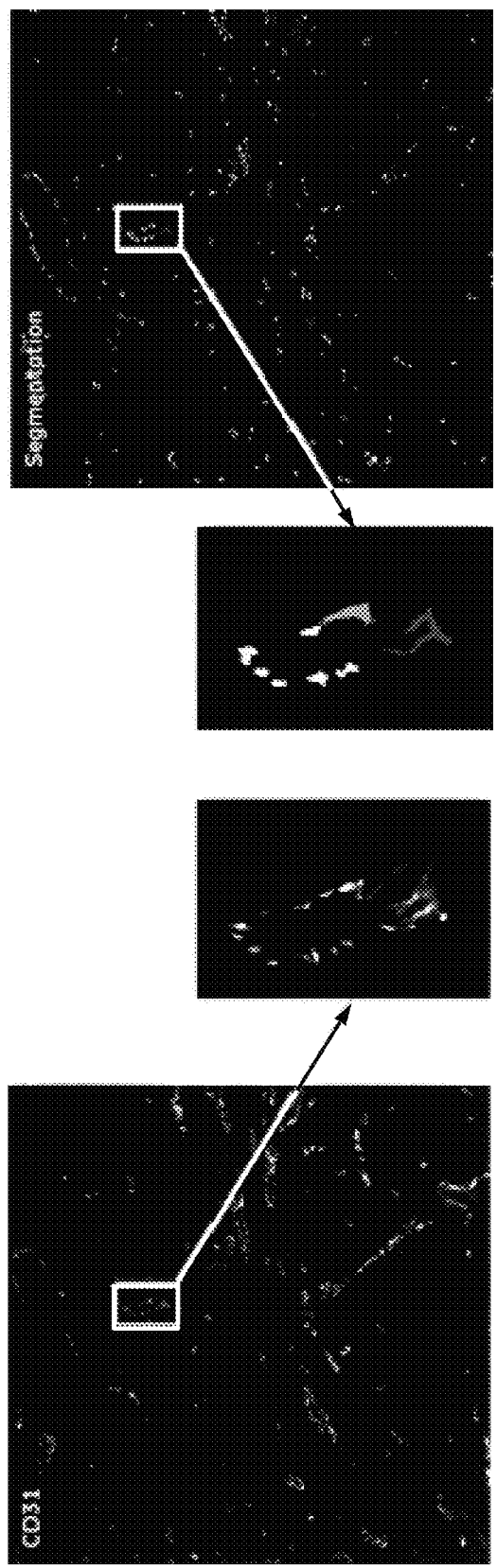
FIGS. 1A through 1D are representative single-marker (CD31) segmentations.

In certain embodiments, images of a single marker, such as CD31, may be used to detect/segment blood vessels in a tissue sample, such as in a biopsy or surgical tissue sample. The tissue is analyzed using the aforementioned multiplexed process and registered, digital images obtained. CD31 is a well-known marker that is used to stain the intercellular junctions of the endothelial cell, which are found on the surface of the blood vessel. While it is considered a specific marker, the resulting image, as shown in FIGS. 1A-1D shows fragmented staining of blood vessels as a result of staining the intercellular junctions. Therefore, using CD31 for segmentation may result in over-fragmented blood vessels. FIGS. 1A-1D are representative single-marker (CD31) segmentations; FIG. 1A is raw date using CD31 marker, FIG. 1B is an expanded region of FIG. 1A, FIG. 1C is the same image as FIG. 1A using a segmentation approach, FIG. 1D is the same expanded region as FIG. 1B from FIG. 1D.

There are other markers, for example CD34, that provide more complete staining of the blood vessel, but they are less specific since they may stain non-vessel structures in the tissue or certain other cell types in the tissue. Therefore, this class of markers alone, are not reliable to segment blood vessels as viewed in the digital images. Other embodiments may use other markers that correlated to blood vessels or expressed in blood vessels such as but not limited to, CD34, CollV, SMA, von Willebrand Factor, or a combination thereof.

As such, in certain embodiments, combining information from the specific, but fragmented, marker CD31 and other less specific, but more filling, markers, such as CD34, may be used to improve the blood vessel segmentation thus identifying the vasculature.

In certain embodiments, a computer-implemented method for transforming an image of the blood vessel may comprise combining the data received from at least one specific (primary) marker (e.g. CD31) and one or more secondary markers to create a new image. In certain embodiments, the transformation may be automatic with no user interaction or annotations. In certain embodiments, the method may also include extraction of images and data from specific regions of interest (ROIs) for training. In certain embodiments, the transformation may include transforming data and images by combining at least two features, such as but not limited to intensity, morphology and multi-channel co-localization features to enhance/reconstruct blood vessel thus identifying the blood vasculature It is worth noting that, individual tissues, cells, and cellular features, are three-dimensional objects, and once samples are obtained as serial fluorescent tissue sections, cells are then described by the two-dimensional projection of the cell by way of their digital image. Depending on the serial section, individual components may not be regular circular objects, but rather can have elliptical shapes or not captured within the same plane; thus the entire structure often is not accurately displayed. As such, in certain embodiments, a method is used to generate a continuous segmentation of blood vessels. The method comprises combining specific, but fragmented primary markers, such as CD31 with other non-specific, but filling, auxiliary markers (e.g. CD34) to generate a continuous segmentation of blood vessels. In certain embodiments, the method comprises the steps illustrated in the flow diagram of FIG. 2. In certain embodiments, the method comprises extracting an initial segmentation mask of the blood vessels using to primary marker, such as CD31 and extracting features that capture information from all of the channels. These features may then be used to create an enhanced blood vessel image. The method further comprises applying a blood vessel tracing and segmentation algorithm to transfer the images from the original data input.

In certain embodiments, the methods may provide for a computer system for performing the image segmentation analysis, the computer including a visual display device, a processing device, and a storage device. The processing device is configured to access multi-channel image data corresponding to a multiplexed image of biological tissue sequentially fluorescent stained and a visual display to provide a rendering of the images and transformed images.

Figure 2:
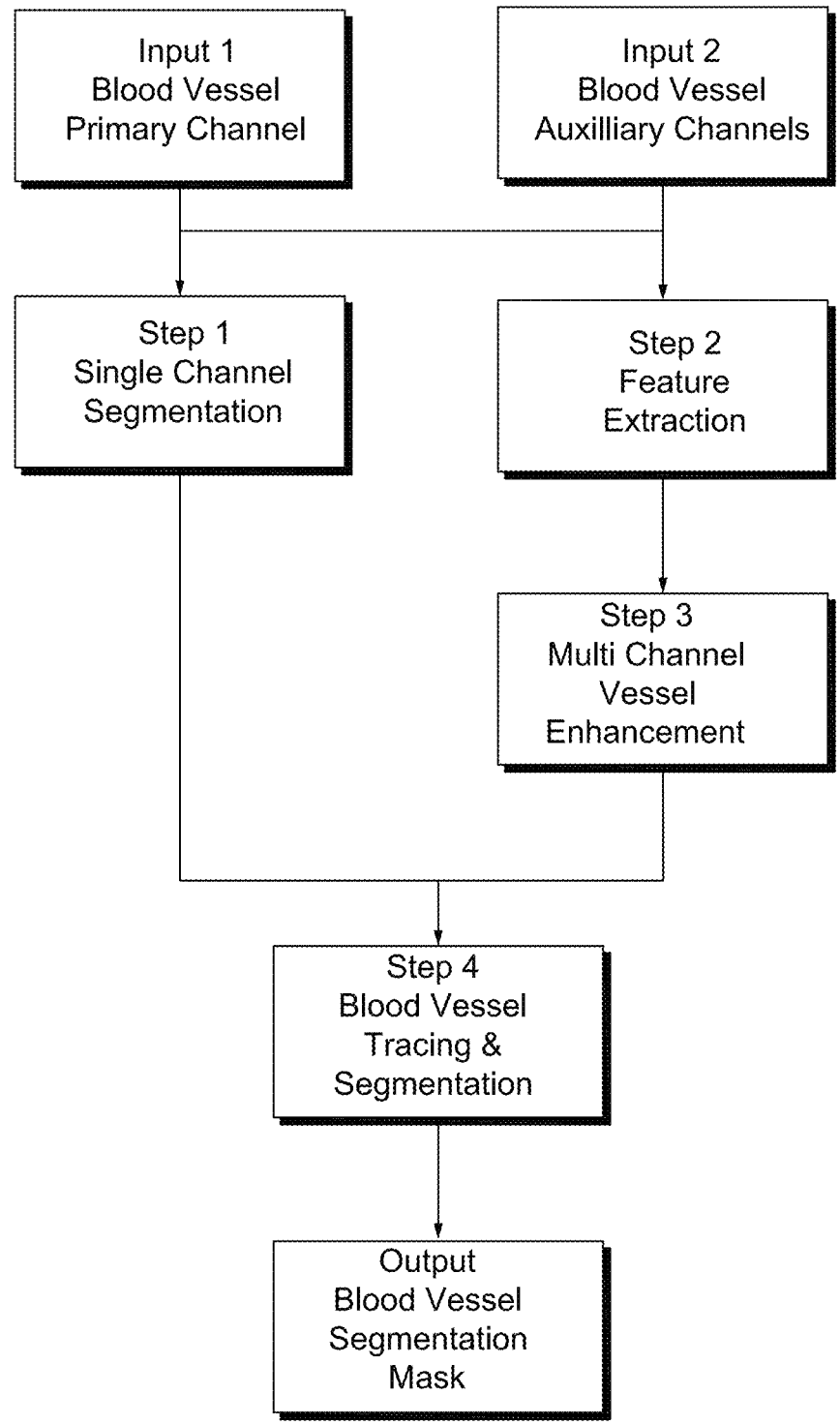
FIG. 2 is a flow chart representative of a method for multi-channel blood vessel segmentation.

In certain embodiments, the initial single-marker segmentation (Step 1 as shown in FIG. 2) may comprise using a single marker, denoted as the primary marker (e.g. CD31) to extract the initial blood vessels mask. In certain embodiments, the primary marker used is a specific marker that stains mostly/only blood vessels such that images obtained after applying the marker shows the resulting stained vessels looking like bright tubular structures in a dark background. The initial blood vessels mask generation may occur in two steps: vessel detection and vessel binarization. Binarization refers to the presence or absence of a vessel or vessel fragment, which in certain embodiments relates to vessel markers associated with the blood vessels map.

In certain embodiments, vessel detection may comprise enhancing, the blood vessels' morphology/while suppressing the non-vessel signal in the image using a Frangi's filter, more specifically a Frangi's multi-scale vesselness filter. Frangi's vesselness filter uses second order partial derivatives of the image to identify ridge-like structures, which is performed in the following equations:

Let I be an image and $G_\sigma$ be a Gaussian filter where a represents its scale Let $L_\sigma$ be the Gaussian filtered image ($I*G_\sigma$) at scale $\sigma$ Let $H(x, y)$ be the Hessian matrix at pixel $(x, y)$, which is computed from the second order partial derivatives as follows:

$$H_\sigma(x, y) = \begin{bmatrix} \frac{\partial^2 L_\sigma(x, y)}{\partial_x^2} & \frac{\partial^2 L_\sigma(x, y)}{\partial_x \partial_y} \\ \frac{\partial^2 L_\sigma(x, y)}{\partial_x \partial_y} & \frac{\partial^2 L_\sigma(x, y)}{\partial_y^2} \end{bmatrix} \quad \text{(equation 1)}$$

Let $\lambda_1$ and $\lambda_2$ be the eigenvalues of $H_\sigma$ such that $|\lambda_1| \geq |\lambda_2|$. Then, Frangi's vesselness at scale a is computed as follows:

$$V_{P\sigma}(x, y) = \begin{cases} (1 - e^{-2R^2})(1 - e^{-8S^2}), & \lambda_1 < 0 \text{ and } \lambda_2 < 0 \\ 0, & \text{otherwise} \end{cases} \quad \text{(equation 2)}$$

Where:

$$R = \frac{|\lambda_1|}{|\lambda_2|} \text{ and } S = \sqrt{\lambda_1^2 + \lambda_2^2}$$

Compute the final vesselness map $V_p(x, y)$ using the pixel-wise maximum across scales:

$$V_p(x,y) = \max(V_{P\sigma}(x,y) | \forall \sigma) \quad \text{(equation 3)}$$

In certain embodiments, the vessel binarization step may comprise, applying an image binarization technique on the vessel enhanced image ($V_p(x, y)$) to extract pixels with high vesselness values (i.e. more likely to be vessels). Several approaches may be used including automatic thresholding (e.g. Otsu's thresholding) and more advance binarization techniques such as Level Sets.

In certain embodiment multi-marker blood vessel segmentation may then be performed on the image. This may comprise generating an initial segmentation mask generated in the previous step and using the primary marker and all of (if any) of the auxiliary markers. This image transformation may be accomplished in three steps: feature extraction, blood vessel enhancement and blood vessel tracing.

In certain embodiments, the feature extraction step may comprise extracting multiple pixel-level features from the primary marker channel (CD31) as well as each of the auxiliary marker channels. Given the primary marker channel $I_p$ and any N auxiliary marker channels $\{I_a^1, \ldots, I_a^N\}$, a vector of 3N+2 features may be computed for each pixel (x, y), which is denoted in the transformed form as F(x, y). In certain embodiments, the feature vector may then be divided into three sets/types of features.

In certain embodiments, the first set includes N+1 feature for each pixel is its normalized intensity values in all of the channels. Let $I_p(x, y)$ and $I_a^i(x, y)$ be the intensity values at pixel (x, y) in the primary marker channel and the $i^{th}$ auxiliary marker respectively, then the normalized intensity values are computed as follows:

$$\hat{I}_p(x, y) = \min\left(\frac{\ln(I_p(x, y))}{I_{max}}, 1\right) \text{ and} \quad \text{(equation 4)}$$

$$\hat{I}_a^i(x, y) = \min\left(\frac{\ln(I_a^i(x, y))}{I_{max}}, 1\right)$$

where ln is the natural Logarithm and the value of $I_{max}$ was empirically set to 10 based on the expected dynamic range of our 16-bit images. The value of each pixel in the normalized images is in the range [0,1].

In certain embodiments, the second set includes N+1 feature for each pixel (x, y), which represent its normalized multiscale vesselness values from all of the channels. Vesselness refers to the relative appearance of an object in the image to resemble the morphological features of a vessel, based on its tubular, circular or elongated structure. As such vesselness may defined in certain embodiments based on model parameters. The vesselness values of the primary marker were computed in the previous initial segmentation step (i.e. $V_p(x, y)$). Apply the same approach to compute the vesselness values for each of the auxiliary markers. The multi-scale vesselness map of the $i^{th}$ auxiliary marker may be denoted as $V_a^i(x, y)$.

In certain embodiments, the last set includes N features representing the normalized pixel-level cross correlation between each auxiliary marker and the primary marker. For instance, the normalized cross correlation value between the $i^{th}$ auxiliary marker and the primary marker at pixel (x, y) is denoted as $C_p^i(x, y)$.

Figures 3A, 3B, 3C, 3D:
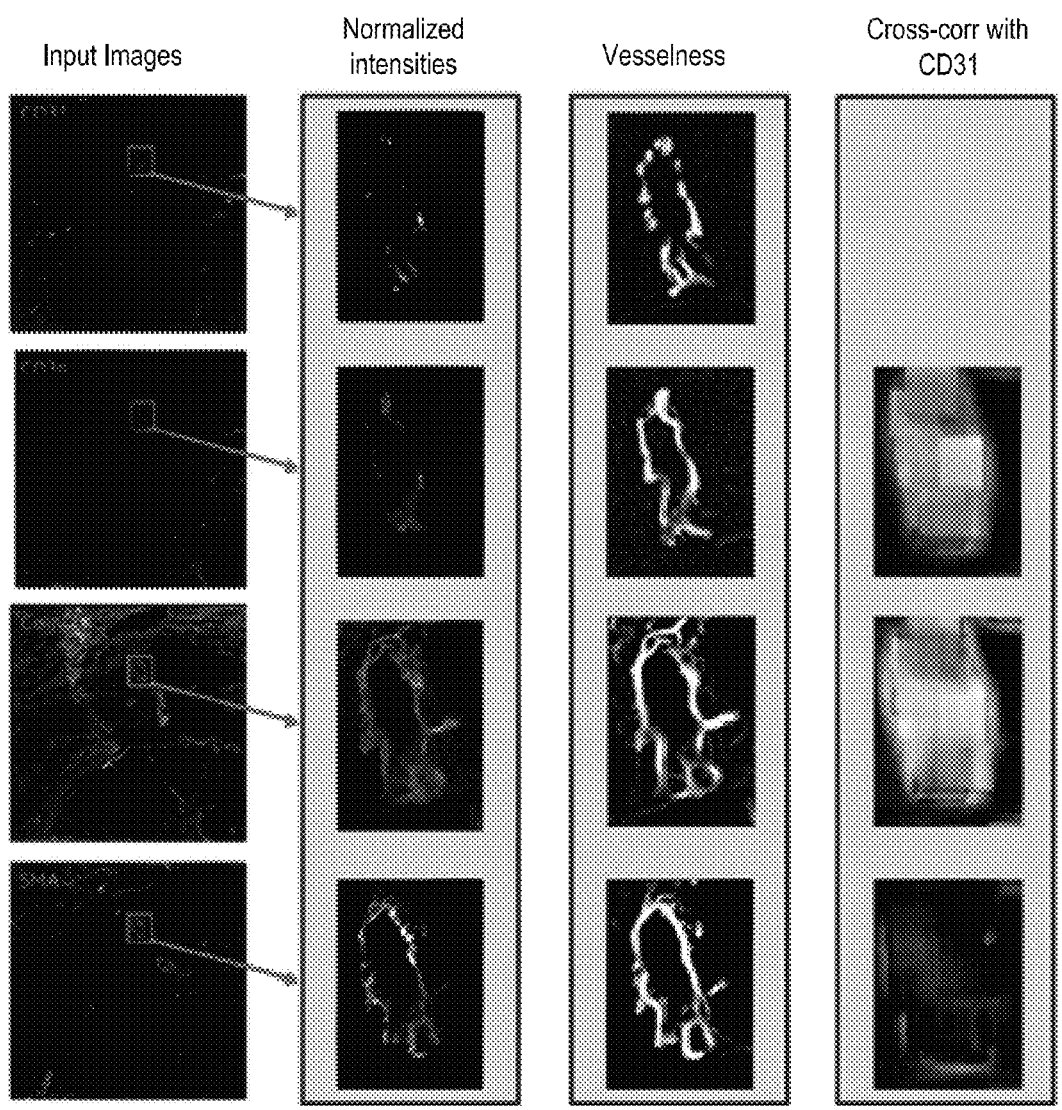
FIGS. 3A-D shows the transformed image and sample features for the close up shown in FIG. 1 using three auxiliary markers: CD34, ColIV and SMA.

Therefore, the feature vector F(x, y) may be defined as:
$\{\hat{I}_p(x,y), \hat{I}_a^1(x,y), \ldots, \hat{I}_a^N(x,y), V_p(x,y), V_a^1(x,y), \ldots, V_a^N(x,y), C_p^1(x,y), \ldots, C_p^N(x,y), D_T(x,y)\}$ FIGS. 3A-3D shows the transformed image and sample features for the close up, expanded region shown in FIGS. 1A-1D, using three auxiliary markers: CD34, ColIV and SMA. FIG. 3A shows raw/input images are shown in the first (left) column; CD31 is used as the primary channel and three auxiliary markers are used: CD34, ColIV and SMA. FIGS. 3B-3D show close-ups of the computed features for the region in the outlined box. The features are (from left to right) normalized intensity (FIG. 3B), Vesselness (FIG. 3C), and cross-correlation with CD31 (FIG. 3D). In certain embodiments, vesselness is calculated using equation 3 above.

In certain embodiments, blood vessel enhancement may then be performed by transforming the data and generating an enhanced blood vessel image, which is also called vessel map $F_v$. The letter F is used to represent the foreground. Similarly, a non-vessel map (i.e. background map), may also be generated which is denoted as $B_v$. The value of each pixel in $F_v$ or $B_v$ is in the range [0,1]. As such, the values may be interpreted as probability values where $P(x, y|vessel)=F_v(x, y)$ represents the likelihood of pixel (x, y) to be on a vessel and $P(x, y|non\_vessel)=B_v(x, y)$ represents the likelihood of pixel (x, y) to be non-vessel.

In certain embodiments, to estimate $F_v$ and $B_v$, the method comprises first automatically extracting training pixels using the distance map from the centerline of the initial segmentation $S_{Init}$, which was generated in the first step. Here the distance at pixel (x, y) is denoted as $D_T(x, y)$. FIGS. 4A-4D shows a sample distance map from the initial CD31 segmentation centerline. FIGS. 4A-D shows a sample distance map; computing distance from initial CD31 segmentation centerline; input image (FIG. 4A), initial segmentation (FIG. 4B), segmentation centerline (FIG. 4C), and distance map (FIG. 4D). The method then comprises defining two sets of pixels $X_f$ and $X_b$, which represent vessel/foreground and non-vessel/background pixels respectively, as follows:

$$X_f = \{\forall (x,y) | D_T(x,y) \leq t\} I \quad \text{(equation 5)}$$

$$X_b = \{\forall (x,y) | D_T(x,y) \geq 10t\} \quad \text{(equation 6)}$$

where t is set to 5.

In certain embodiments, the method further comprises applying the K-NN (K-nearest neighbors) non-parametric density estimation method to estimate $F_v(x, y)$ and $B_v(x, y)$ using the sets of training samples $X_f$ and $X_b$ respectively. More specifically, FIGS. 5A-C, shows sample vessel $F_v$ and non-vessel $B_v$ probability maps. FIG. 5A is the raw image of CD 31 marker, FIG. 5B is the foreground probability map, and FIG. 5C is the background probability map. Each image shows the same expanded region.

Figure 6:
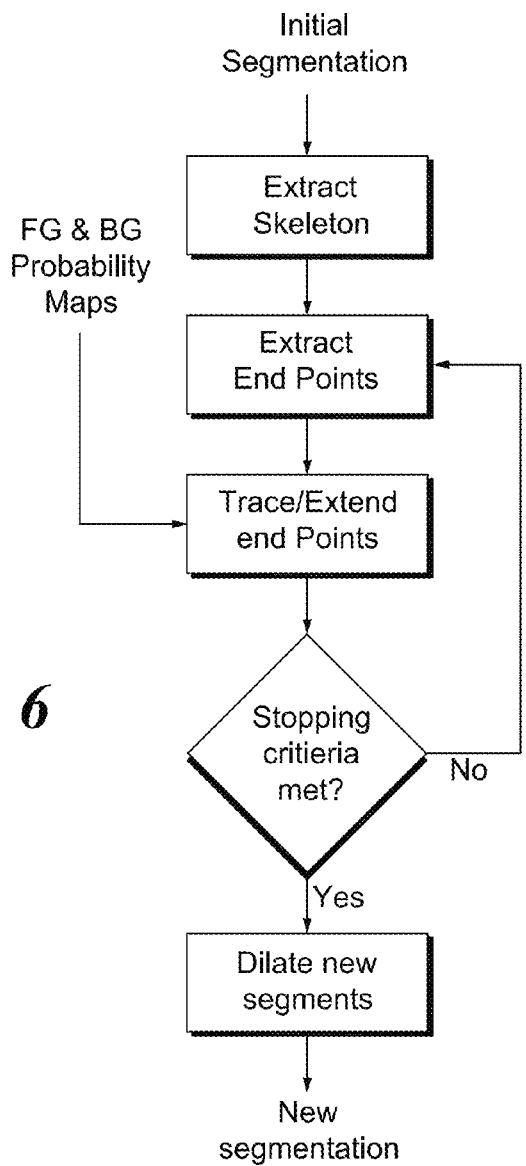
FIG. 6 is a high-level process flow diagram illustrating an iterative vessel tracing approach.

In certain embodiment, blood vessel tracing and segmentation is performed to further transform the image. In certain embodiments this comprises using the initial segmentation and the probability maps ($F_v$ and $B_v$) to extend the initial segmentation to improve its continuity and completeness. This may be accomplished by an iterative tracing-based approach, which is further illustrated in the flow chart in FIG. 6.

Figure 7:
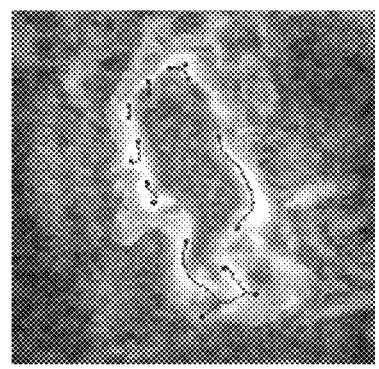
FIG. 7 is an image showing a sample blood vessel segmentation skeleton (red) and end points (blue) overlaid on a vessel/foreground probability map.

The iterative approach may comprise extracting the centerline/skeleton of the initial segmentation. Then end points may then be extracted and evaluated/extended one at a time. FIG. 7 shows a sample segmentation skeleton (dark line segments) overlaid on top of the vessel/foreground probability map with the end points shown.

Each tracing iteration at any end point (x, y) may proceed as follows:

Compute end point direction ($\theta_0$) using last K (e.g. 5) points, and compute four other directions as follows:

$$\begin{cases} \theta_1 = \theta_0 - 30 \\ \theta_2 = \theta_0 - 15 \\ \theta_3 = \theta_0 + 15 \\ \theta_4 = \theta_0 + 30 \end{cases} \quad \text{(equation 7)}$$

Figure 8:
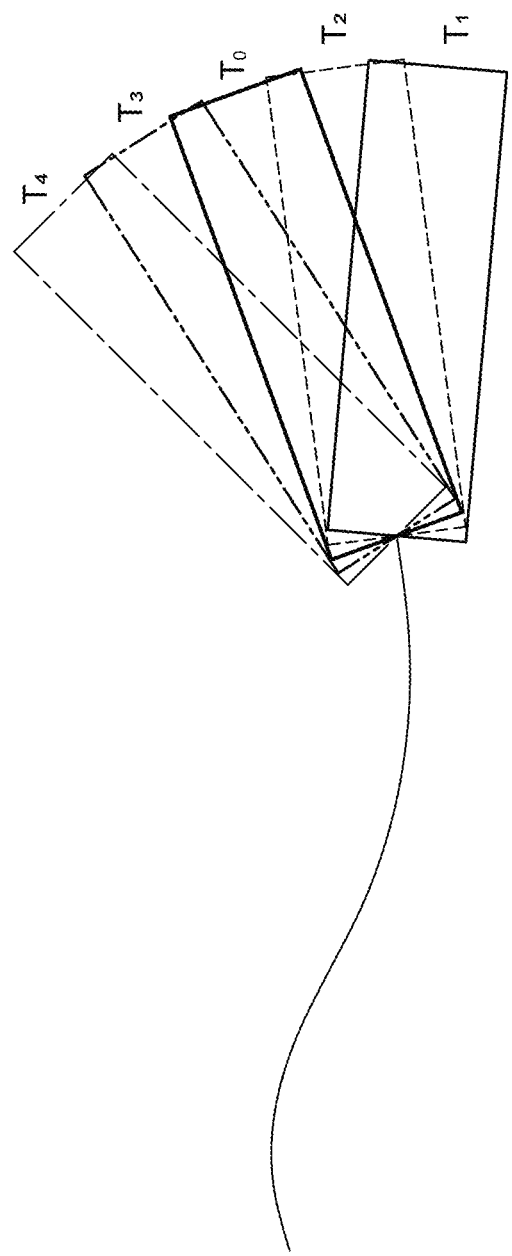
FIG. 8 is a diagram illustrating the different templates and their orientations at any end point of a vessel fragment.

FIG. 8 illustrates different templates and their orientations at any end point of a vessel fragment. As such in certain embodiments, the method comprises extracting a template $T_i$ of size M×N (default is 10×5) at each direction $\theta_i$ (as shown in FIG. 8) and compute average foreground ($Fg_i$) and background ($Bg_i$) probabilities as follows:

$$Fg_i = \frac{1}{\|T_i\|} \sum_{(x,y) \in T_i} F_v(x, y) \quad \text{(equation 8)}$$

$$Bg_i = \frac{1}{\|T_i\|} \sum_{(x,y) \in T_i} B_v(x, y) \quad \text{(equation 9)}$$

where $\|T_i\|$ represents the size/area of the template $T_i$.

Given the computed $Fg_i$ and $Bg_i$ for each template $T_i$, in certain embodiments two hypotheses may be defined as follows:

$H_0$: template $T_i$ is background
$H_1$: template $T_i$ is foreground

Then, the method further comprises, selecting the direction of extension (if any) for the end point using the template the maximizes a likelihood ratio test as follows, where the ration test is defined according to equation 10:

$$\operatorname*{argmax}_{i}\left(\frac{Fg_i}{Bg_i}\right) \begin{matrix} < H_0 \\ > H_1 \end{matrix} \tau \quad (\tau \text{ is set to } 1.5) \quad \text{(equation 10)}$$

If any $T_i$ satisfied the ratio test above, then the method allows for extending the end point (x, y) by N pixels (N=10 or until it hits another segment) in the direction $\theta_i$.

Figure 9B:
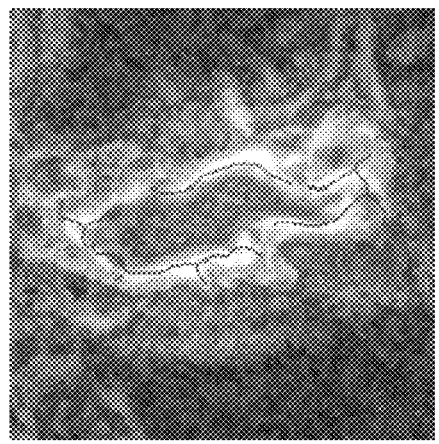
FIGS. 9A-D shows the iterative extension results of the centerline/skeleton from FIG. 7 (using 4 iterations).
Figure 9D:
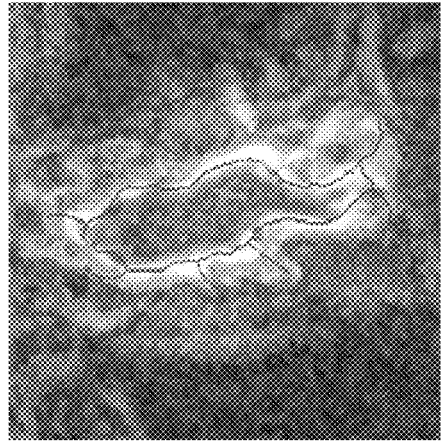
Figure 9A:
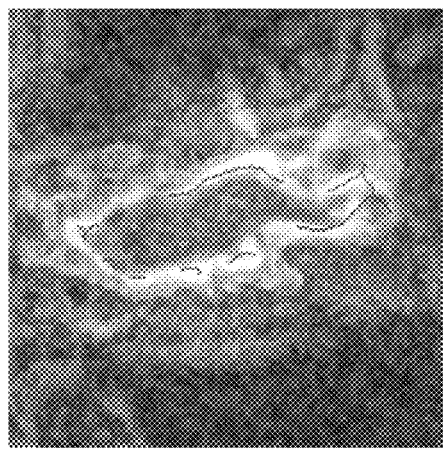
Figure 9C:
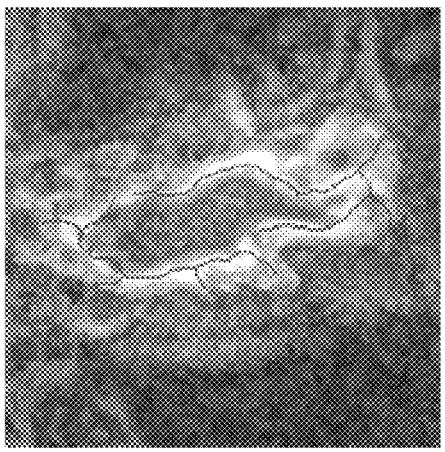

FIGS. 9A through 9D, shows the iterative extension results of the centerline/skeleton from FIG. 7 (using 4 iterations). As shown, there are four iterations of the tracing algorithm. FIGS. 9A-D shows the iterative extension results of the centerline/skeleton from FIG. 7. In certain embodiments, additional interactions may be use. As shown, there are four iterations of the tracing algorithm; FIG. 9A is iteration 1, FIG. 9B is iteration 2, FIG. 9C is iteration 3, and FIG. 9D is iteration 4. The blood vessel segmentation starts with seven fragments at iteration 1 and ends with only one at iteration 4.

The tracing step extends end points of the initial fragments to generate a more complete blood vessel segmentation. However, there are two main limitations of the tracing approach. First, the algorithm does not exclude false positive fragments (over segmentation) in the initial segmentation. As such, some of those false positive fragments may be inaccurately extended. Additionally, in certain analyses, there is no guarantee that all of the gaps in the blood vessel segmentation are filled as a result of not passing the test at a given segment (low vessel/foreground probability compared to non-vessel/background probability) or just because of reaching the maximum number of iterations before completely filling a gap. Therefore, additional segmentation may be achieved through post-processing steps for further refinement.

The following method may be used in certain embodiments. In the first post-processing step, remove as many as possible of the false positive fragments by applying the following criteria on each fragment (after tracing):

exclude fragments close to image edges (e.g. up to 50 pixels) where one or more auxiliary markers are not present; and exclude short, isolated fragments. These are defined as the fragments that are shorter than a minimum length (e.g. 30 pixels) and more than a minimum distance (e.g. 50 pixels) from any other fragment.

Figure 10:
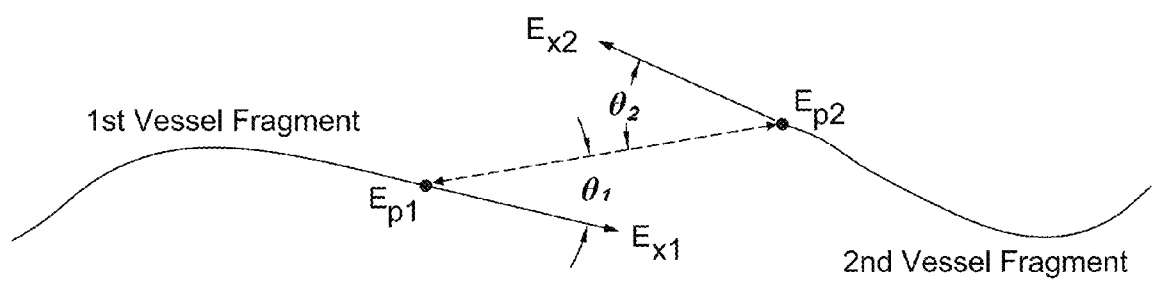
FIG. 10 is a diagram illustrating the geometric rules used to connect end points of neighboring vessel fragments not connected/extended in the tracing step.

In the second post-processing step, two geometric rules are applied to fill gaps (i.e. connect the corresponding end points) missed in the tracing step. As illustrated in FIG. 10, given two end points $E_{p1}$ and $E_{p2}$ of any two fragments, let D be the line connecting the two points (dashed red), let $E_{X1}$ and $E_{X2}$ be the two rays extending $E_{p1}$ and $E_{p2}$ respectively in the same direction as the last N points (e.g. N=10) in the two fragments and let $\theta_1$ and $\theta_2$ be the two angles between line D and the two rays $E_{X1}$ and $E_{X2}$ respectively, then the two points ($E_{p1}$ and $E_{p2}$) are connected (using line D) if the following two rules are satisfied:

the distance between the two end points is less than or equal a maximum distance threshold $T_d$ (e.g. 20 pixels). Mathematically: $|D| \leq T_d$; and the two points need to be pointing toward each other with an orientation difference less than a threshold $\theta_d$ (e.g. 45°). Mathematically: $\theta_1 + \theta_2 \leq \theta_d$.

This is illustrated in FIG. 10, which is a diagram illustrating the geometric rules used to connect end points of neighboring vessel fragments not connected/extended in the tracing step.

Results

In order to assess the performance of our algorithm, a data set of 9 images was selected with different numbers of blood vessels and varying image quality. Then, those images were segmented using a single-marker (CD31) approach and then using our proposed multi-marker approach. The results were first evaluated/compared qualitatively by two biologists, who confirmed that the proposed multi-marker algorithm significantly improves the blood vessels segmentation. FIGS. 11A-C and FIGS. 12A-C show sample segmentation results from the two approaches.

FIGS. 11A through 11C are sample blood vessel segmentation result using a single marker (CD31) approach and the proposed multi-marker approach; FIG. 11A is the raw data image using CD31 marker, FIG. 11B is the single-marker segmentation of the raw image, and FIG. 11C is the multi-marker segmentation. Each image shows the same expanded regions. As shown in FIG. 11A through 11C, the multi-marker approach resulted in more complete/continuous segmentation of the vessels with less over-fragmentation.

Figure 12C:
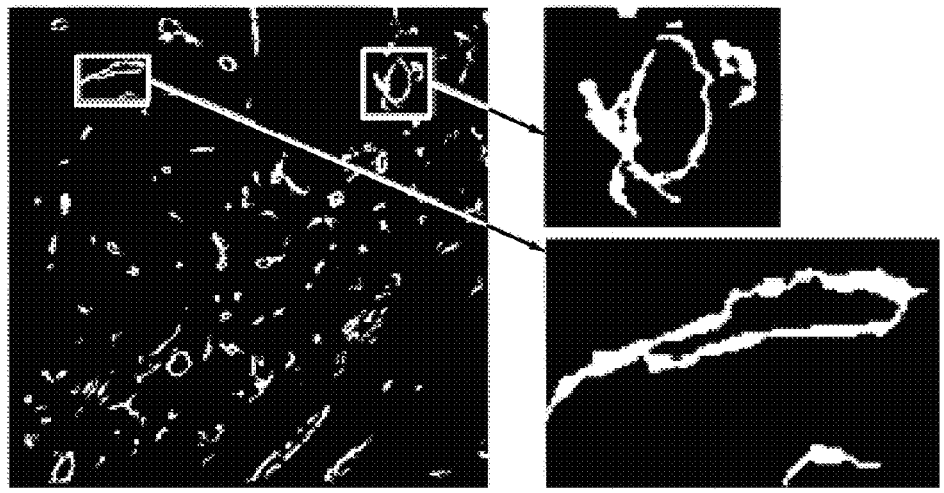
FIGS. 12A-C illustrates sample blood vessel segmentation results using a single marker (CD31) approach and the new multi-marker approach.
Figure 12B:
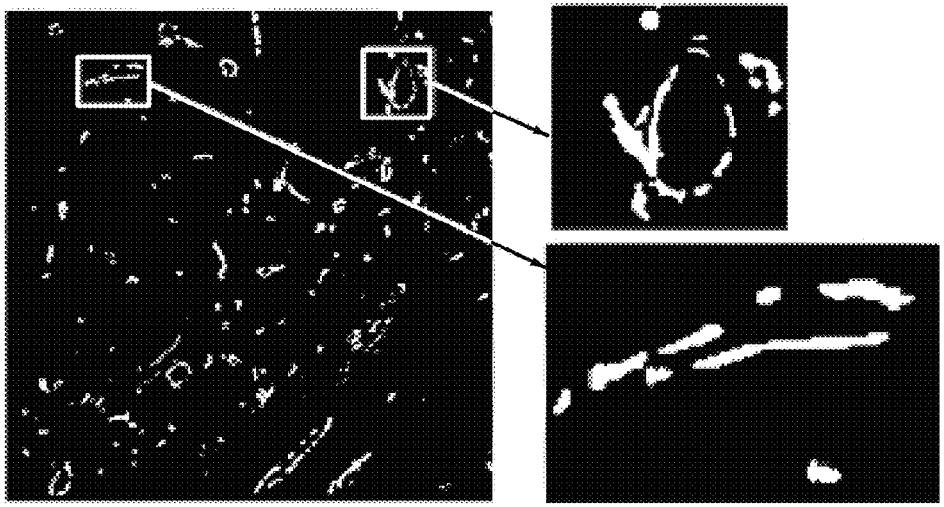
Figure 12A:
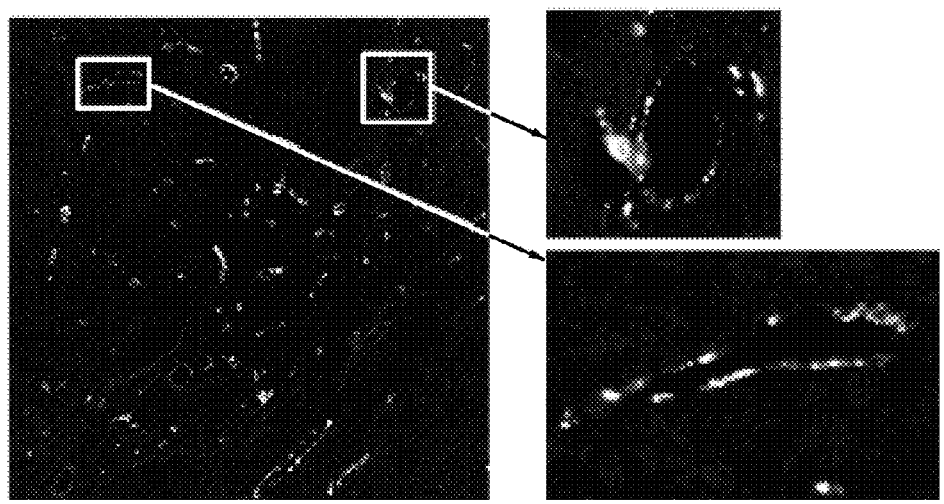

FIGS. 12A-C uses the same process as FIGS. 11A-C. FIGS. 12A-C is another sample blood vessel segmentation result using a single marker (CD31) approach and the proposed multi-marker approach. Again, the approach resulted in more complete/continuous segmentation of the vessels with less over-fragmentation, FIG. 12A is the raw data image using CD31 marker, FIG. 12B is the single-marker segmentation of the raw image, and FIG. 12C is the multi-marker segmentation. Each image shows the same expanded regions. As shown in FIG. 12A through 12C, the multimarker approach resulted in more complete/continuous segmentation of the vessels with less over-fragmentation.

In addition to the qualitative evaluation, visual inspection was used to count the numbers of vessels in the raw images. To accomplish this, composite colored images were created from multiple markers and a common criterion used to define blood vessels was agreed upon. Two observers counted the number of vessels in each image independently and without looking at the segmentation results. The observers' counts were compared to the automated counts. Table 1 below lists the numbers of vessels estimated by the observers compared to those detected by the single and multi-marker segmentation algorithms. Vessel count, which also relates to vessel density provides a measurement of quantifying blood vessels within the tissue sample to allow for analysis and quantification. In certain embodiments, this may also be represented as a percentage of the sample.

TABLE 1

Comparing Manual and Automated blood vessel counts

| FOV | Manual | | Automated | |
| --- | --- | --- | --- | --- |
| | Observer 1 | Observer 2 | Single Marker | Multi-Marker |
| 1 | 93 | 87 | 261 | 96 |
| 2 | 81 | 104 | 301 | 88 |
| 3 | 69 | 61 | 208 | 68 |
| 4 | 65 | 59 | 236 | 97 |
| 5 | 126 | 150 | 426 | 141 |
| 6 | 9 | 7 | 421 | 141 |
| 7 | 21 | 22 | 99 | 29 |
| 8 | 32 | 22 | 243 | 87 |
| 9 | 105 | 107 | 220 | 104 |

Figure 13:
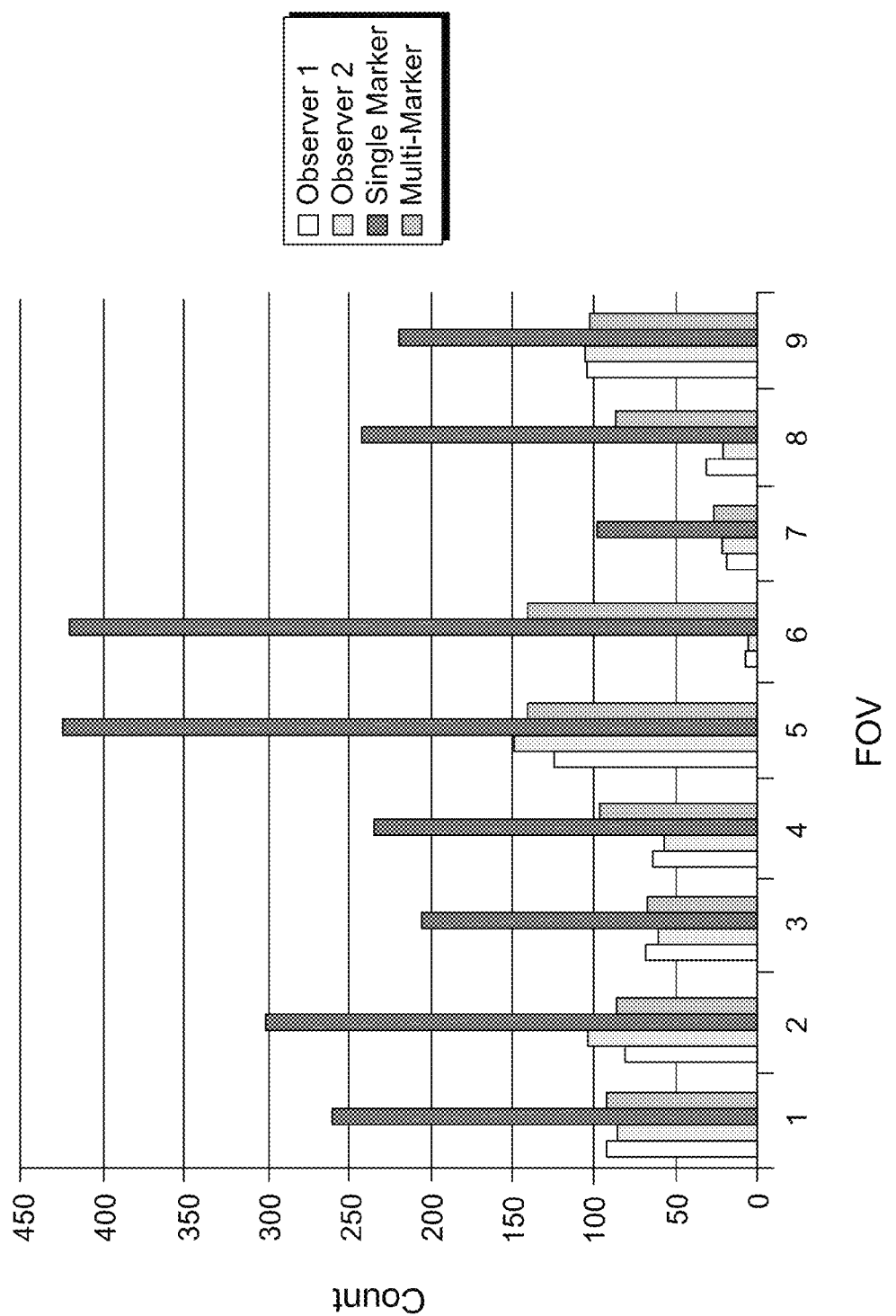
FIG. 13 is a bar chart comparing manual and automated blood vessel counts.

A bar chart representation is also shown in FIG. 13. As shown, the multi-marker algorithm reduces the vessel over-fragmentation significantly and the numbers of detected vessels are very close to those found by the observers in most of the cases.

In one embodiment of the invention Algorithms for Blood Vessels Analysis in Highly Multiplexed Fluorescence Imaging is provided. The method includes:

a.) Initial Segmentation: an initial segmentation algorithm is applied on a specific marker (e.g. CD31) to extract an initial estimate of the blood vessel segmentation;

b.) Feature extraction: Multiple pixel-level features are extracted from the specific marker channel as well as the auxiliary markers. These include intensity (of each marker), vesselness (of each marker), cross-correlation of each auxiliary marker with the specific marker (e.g. CD31) and distance from the centerline of the initial segmentation.

c) Computing probability map: foreground (blood vessels) and background (non-vessel) probability maps are estimated. In order to do that, a training set is extracted automatically using the initial segmentation as the foreground training samples, and pixels that are 50-100 away are used as background training samples. Then, a non-parametric density estimation method (KNN) is applied on the training pixel features to estimate foreground and background probability distributions. Then, compute foreground and background probability maps by computing the probability of each pixel to be a vessel or non-vessel pixel respectively.

d.) Tracing by iteratively extending the centerlines of the initial segmentation using statistical models (probability maps) and geometric rules.

1.) extract the end points of the centerline (skeleton) of the initial segmentation.

2.) compute the direction of each end point using the last N (e.g. 10) points in that vessel fragment. This is called the base direction.

3.) define K (e.g. 5) other directions above and below the base direction using a step size of 15 degrees. These are called Possible directions.

4.) extract a template T of size R×C (e.g. 10×5) at each direction (both base and possible directions) and compute the average foreground and background probabilities for each template by defining two hypotheses for each template T and choosing the template that maximizes the ratio test:

H0: template is background
H1: template is foreground; and e.) Post-processing/filtering to filter out blood vessels.

In certain embodiments, a method of Identifying and counting blood vessels in a tissue sample is also provided. The method comprising creating multiple images from multiplexed imaging and registration of the image, analyzing the images using a processor to provide for angiogenesis analysis and blood vessel segmentation.

In certain embodiments systems and methods disclosed herein may include one or more programmable processing units having associated therewith executable instructions held on one or more non-transitory computer readable media, RAM, ROM, hard drive, and/or hardware. In exemplary embodiments, the hardware, firmware and/or executable code may be provided, for example, as upgrade module(s) for use in conjunction with existing infrastructure (for example, existing devices/processing units). Hardware may, for example, include components and/or logic circuitry for executing the embodiments taught herein as a computing process.

The term "computer-readable medium," as used herein, refers to a non-transitory storage hardware, non-transitory storage device or product or non-transitory computer system memory that may be accessed by a controller, a processor, a microcontroller, a computational system or a module of a computational system to encode thereon computer-executable instructions or software programs. The "computer-readable medium" may be accessed by a computational system or a module of a computational system to retrieve and/or execute the computer-executable instructions or software programs encoded on the medium. The non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM) and the like.

Figure 14:
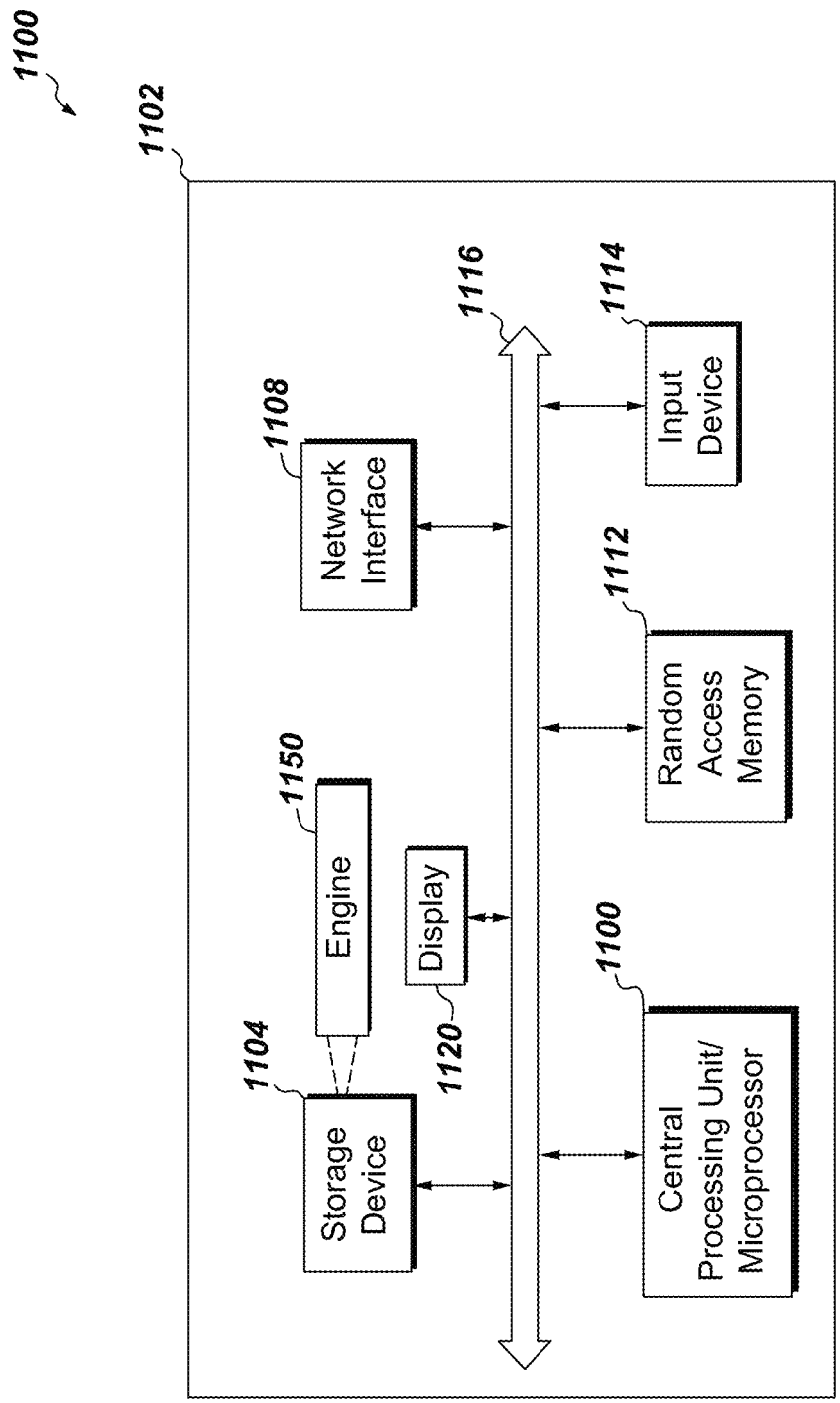
FIG. 14 is a diagram showing hardware and software components of an exemplary system 1100 capable of performing the processes described.

FIG. 14 is a diagram showing hardware and software components of an exemplary system 1100 capable of performing the processes described herein. The system 1100 includes a computing device 1102, which can include a storage device 1104, a network interface 1108, a communications bus 1116, a central processing unit (CPU) 1110, e.g., a microprocessor, and the like, a random access memory (RAM) 1112, and one or more input devices 1114, e.g., a keyboard, a mouse, and the like. The computing device 1102 can also include a display 1120, e.g., liquid crystals display (LCD), a cathode ray tube (CRT), and the like. The storage device 1104 can include any suitable, computer-readable storage medium, e.g., a disk, non-volatile memory, read-only memory (ROM), erasable programmable ROM (EPROM), electrically-erasable programmable ROM (EEPROM), flash memory, field-programmable gate array (FPGA), and the like. The computing device 1102 can be, e.g., a networked computer system, a personal computer, a smart phone, a tablet, and the like.

In exemplary embodiments, exemplary embodiments of an engine 1150 programmed to implement one or more processes described herein, can be embodied as computer-readable program code stored on one or more non-transitory computer-readable storage device 1104 and can be executed by the CPU 1110 using any suitable, high or low level computing language, such as, e.g., Java, C, C++, C#, .NET, Python, and the like. Execution of the computer-readable code by the CPU 1110 can cause CPU 1110 to implement an exemplary embodiment of one or more processes described herein.

While the disclosure has been illustrated and described in typical embodiments, it is not intended to be limited to the details shown, since various modifications and substitutions may be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

The invention claimed is:

1. A computer-implemented method for creating a blood vessel map of a biological tissue, the method comprising the steps of:
    accessing image data corresponding to a multi-channel multiplexed image of a biological tissue fluorescent stained to manifest expression levels of a primary marker and at least one auxiliary marker, each marker marking blood vasculature;
    extracting features of blood vessels using the primary marker as an input to create an initial single channel segmentation of the blood vessels as a first input;
    extracting features of blood vessels using the at least one auxiliary marker to create auxiliary channel segmentations as a second input and applying multi-channel blood vessel enhancement to the first and second inputs;
    computing a probability map using the extracted features;
    tracing the blood vasculature by iteratively extending the centerlines of the initial single channel segmentation using statistical models and geometric rules; and
    generating a corresponding blood vessel map.

2. The method of claim 1 further comprising rendering on a visual display device a representation of the blood vessels within the tissue sample.

3. The method of claim 1 where the primary marker is CD31.

4. The method of claim 1 where the auxiliary marker is CD34, ColIV, SMA, von Willebrand Factor or a combination thereof.

5. The method of claim 1 where the biological tissue is a biopsy or surgical sample.

6. The method of claim 1 where generating a blood vessel map further comprises at least one of enhancing the blood vessels' morphology or suppressing the non-vessel signal in the image data.

7. The method of claim 6 where the enhancing comprises using a Frangi's filter.

8. The method of claim 7 where using the Frangi's filter comprises the steps of transforming the image data into pixel scale such that:
    I is an image and $G\_\sigma$ is a Gaussian filter where $\sigma$ represents its scale;
    $L\_\sigma$ is an Gaussian filtered image ($I*G\_\sigma$) at scale $\sigma$; and
    $H(x,y)$ is a Hessian matrix at pixel $(x,y)$, computed from the second order partial derivatives as:

$$H_\sigma(x, y) = \begin{bmatrix} \frac{\partial^2 L_\sigma(x, y)}{\partial_x^2} & \frac{\partial^2 L_\sigma(x, y)}{\partial_x \partial_y} \\ \frac{\partial^2 L_\sigma(x, y)}{\partial_x \partial_y} & \frac{\partial^2 L_\sigma(x, y)}{\partial_y^2} \end{bmatrix}$$

where $\lambda_1$ and $\lambda_2$ be the eigenvalues of $H_\sigma$ such that $|\lambda_1| \geq |\lambda_2|$;
computing Frangi's scale $\sigma$ as:

$$V_{P_\sigma}(x, y) = \begin{cases} (1 - e^{-2R^2})(1 - e^{-8S^2}), & \lambda_1 < 0 \text{ and } \lambda_2 < 0 \\ 0, & \text{otherwise} \end{cases} ; \text{and}$$

$$R = \frac{|\lambda_1|}{|\lambda_2|} \text{ and } S = \sqrt{\lambda_1^2 + \lambda_2^2} \text{; and}$$

and creating a map $V_p(x, y)$ using the pixel-wise maximum across scales as:

$$V_p(x,y) = \max(V_{P_\sigma}(x,y) | \forall \sigma).$$

9. The method of claim 1 where tracing further comprises using the initial single channel segmentation and the probability map to extend the initial single channel segmentation to improve its continuity and completeness.

10. The method of claim 9 where the tracing is iterative.

11. The method of claim 10 where iterative tracing comprises
    extracting the centerline of the initial single channel segmentation to create initial fragments;
    identifying the end points of the initial fragments;
    extending the end points of the initial fragments to generate a more complete blood vessel segmentation.

12. The method of claim 11 where extending the end points comprises creating a template to identify foreground and background probabilities to categorize features as blood vessels.

13. The method of claim 12 where creating a template comprises:
    Creating a template $T_i$ of size M×N at each direction $\theta_i$ and compute average foreground ($Fg_i$) and background ($Bg_i$) probabilities as;

$$Fg_i = \frac{1}{\|T_i\|} \sum_{(x,y) \in T_i} F_v(x, y);$$

$$Bg_i = \frac{1}{\|T_i\|} \sum_{(x,y) \in T_i} B_v(x, y); \text{and}$$

where $\|T_i\|$ represents the size/area of the template $T_i$, and 'M' and 'N' are positive integers.

14. The method of claim 13 further comprising testing hypothesis ($H_0$ and $H_1$) to extend the end points where:
    $H_0$: template $T_i$ is background
    $H_1$: template $T_i$ is foreground; and
    selecting the direction of extension for the end point a ratio test such that, the ratio test is $$\operatorname*{argmax}_i \left( \frac{Fg_i}{Bg_i} \right) \begin{matrix} < H_0 \\ > H_1 \end{matrix} \tau \quad (\tau \text{ is set to 1.5});$$

and
    if $T_i$ satisfied the ratio test; then
        extending the end point $(x, y)$ by a predetermined number of pixels until the endpoints intersects another segment in the direction $\theta_i$.

15. The method of claim 8 where the map is used to analyze and quantify vasculature in a tissue sample.

16. The method of claim 10 where the biological tissue is a biopsy or surgical sample.

17. The method of claim 10 further comprising creating a blood vessel segmentation mask based on the identified blood vessels.

\* \* \* \* \*